United States Patent [19]

Chupka et al.

[11] Patent Number: 4,663,030

[45] Date of Patent: May 5, 1987

[54] DISK ROTOR FOR SELECTIFIER SCREEN

[75] Inventors: David E. Chupka, Middletown; Mark W. Gilkey, Oxford; Jimmy L. Winkler; Larry D. Markham, both of Middletown, all of Ohio

[73] Assignee: The Black Clawson Company, Middletown, Ohio

[21] Appl. No.: 853,376

[22] Filed: Apr. 15, 1986

Related U.S. Application Data

[63] Continuation of Ser. No. 699,602, Feb. 8, 1985, abandoned.

[51] Int. Cl.⁴ .................. B07B 1/20; B01D 29/00; D21C 7/00
[52] U.S. Cl. ..................... 209/306; 209/250; 209/273; 210/415; 162/55; 162/251; 241/74
[58] Field of Search ............. 209/273, 250, 306, 283; 210/413, 414, 415; 162/55, 251; 241/46 B, 46.08, 74

[56] References Cited

U.S. PATENT DOCUMENTS

| | | | |
|---|---|---|---|
| 791,566 | 6/1905 | Mayer | 209/250 X |
| 982,454 | 1/1911 | Willoughby | 209/306 |
| 1,036,318 | 6/1912 | Pariter | 209/273 |
| 1,172,239 | 4/1916 | Haug | 209/270 |
| 1,525,449 | 2/1925 | Johnson | 209/415 |
| 2,347,716 | 5/1944 | Stopge | 209/273 |
| 2,845,848 | 8/1958 | Bowen | 209/283 X |
| 2,908,390 | 9/1959 | Rich et al. | 209/273 |
| 3,145,165 | 8/1964 | Sandison | 209/273 X |
| 3,680,696 | 8/1972 | Morin | 209/273 X |
| 4,396,502 | 8/1983 | Justus | 209/273 |

Primary Examiner—S. Leon Bashore
Assistant Examiner—Thomas M. Lithgow
Attorney, Agent, or Firm—Biebel, French & Nauman

[57] ABSTRACT

In screening apparatus for paper making stock including a housing, a cylindrical perforated screen member separating the interior of the housing into a supply chamber and an accepts chamber on the inside and outside respectively of the screen member, an inlet port for supplying stock to one end of the supply chamber, an outlet port from the accepts chamber, a reject port from the supply chamber, and a rotor mounted for rotation within the screen member, the rotor is characterized by comprising a substantially circular disk which is of a thickness constituting a very minor fraction of the axial length of the screen member and has vanes mounted on its outer periphery which extend lengthwise of the screen member for rotation with the disk in the annular space between the periphery of the disk and the inner surface of the screen member.

2 Claims, 5 Drawing Figures

DISK ROTOR FOR SELECTIFIER SCREEN

This is a continuation of co-pending application Ser. No. 699,602, filed Feb. 8, 1985, now abandoned.

BACKGROUND OF THE INVENTION

Paper mills have for many years made extensive use, for the cleaning of paper making stock, of pressure screening apparatus embodying a cylindrical perforated screening member defining supply and accepts chambers on the opposite sides thereof in a closed housing, and including a rotor member which operates in one of the chambers to keep the screening perforations open and free from solid material tending to cling to the screening surface. Commonly, the stock or furnish is delivered to the supply chamber adjacent one end of the screening cylinder, and the material rejected oy the screening cylinder is collected and discharged from the opposite end of the supply chamber.

The assignee of this invention has manufactured many such screens in accordance with a series of U.S. patents, commencing with Staege U.S. Pat. No. 2,347,716, and followed by Martindale U.S. Pat. No. 2,835,173, Seifert U.S. Pat. Nos. 3,849,302 and 4,105,543, Seifert-Chupka U.S. Pat. No. 3,970,548 and Chupka-Seifert U.S. Pat. Nos. 4,155,841 and 4,383,918. These patents demonstrate substantial detailed variation in screens of the above type, especially in the size, configuration and spacing of the perforations in the screening cylinder. Less consideration has been given to improving the construction and operation of the rotor, however, except for Seifert-Chupka '548 wherein the rotor is of special construction for enabling the screen to handle dirty stock, and particularly stock having multiple stringy contaminants.

SUMMARY OF THE INVENTION

The primary object of the present invention is to provide a screen generally of the construction shown in the Martindale and other patents noted above wherein the rotor is specially constructed to insure high capacity of the screen from the standpoint of the quantity of the fiber that it can handle successfully while at the same time materially decreasing the power requirements of the screen as compared with other pressure screens suitable for the same uses.

This result is accomplished by means of a vaned rotor wherein the vanes are supported by a simple disk which is located generally centrally of the screening cylinder and has the vanes secured to its periphery for rotation therewith around the inner surface of the screening cylinder. In the simplest embodiment of the invention, the rotor comprises a flat substantially circular plate of sufficiently smaller outer diameter than the inner diameter of the screening cylinder to rotate freely therein, and the vanes are welded or otherwise secured to the periphery of this plate.

In a typical application of the invention as summarized above, a screen equipped with such rotor was compared with a screen having a conventional rotor of the type shown in Seifert U.S. Pat. No. 3,849,302, the tests being carried out with stock of the same feed consistency (3.49%), two different rotor speeds (640 and 680 prm), the same feed rates (1740 gpm), and the same pressure drops (4.5 and 4.0 psi) at the two rotor speeds. The results of these tests showed identical accepts and rejects flows (1485 and 255 gpm) for all four tests, but where the conventional rotor required 47.0 and 56.3 horsepower for the two speeds, the rotor of the invention required only 37.5 and 45.6 horsepower respectively, namely power savings of the order of 20% in each case.

DESCRIPTION OF THE PREFERRED EMBODIMENTS

Figure 1:
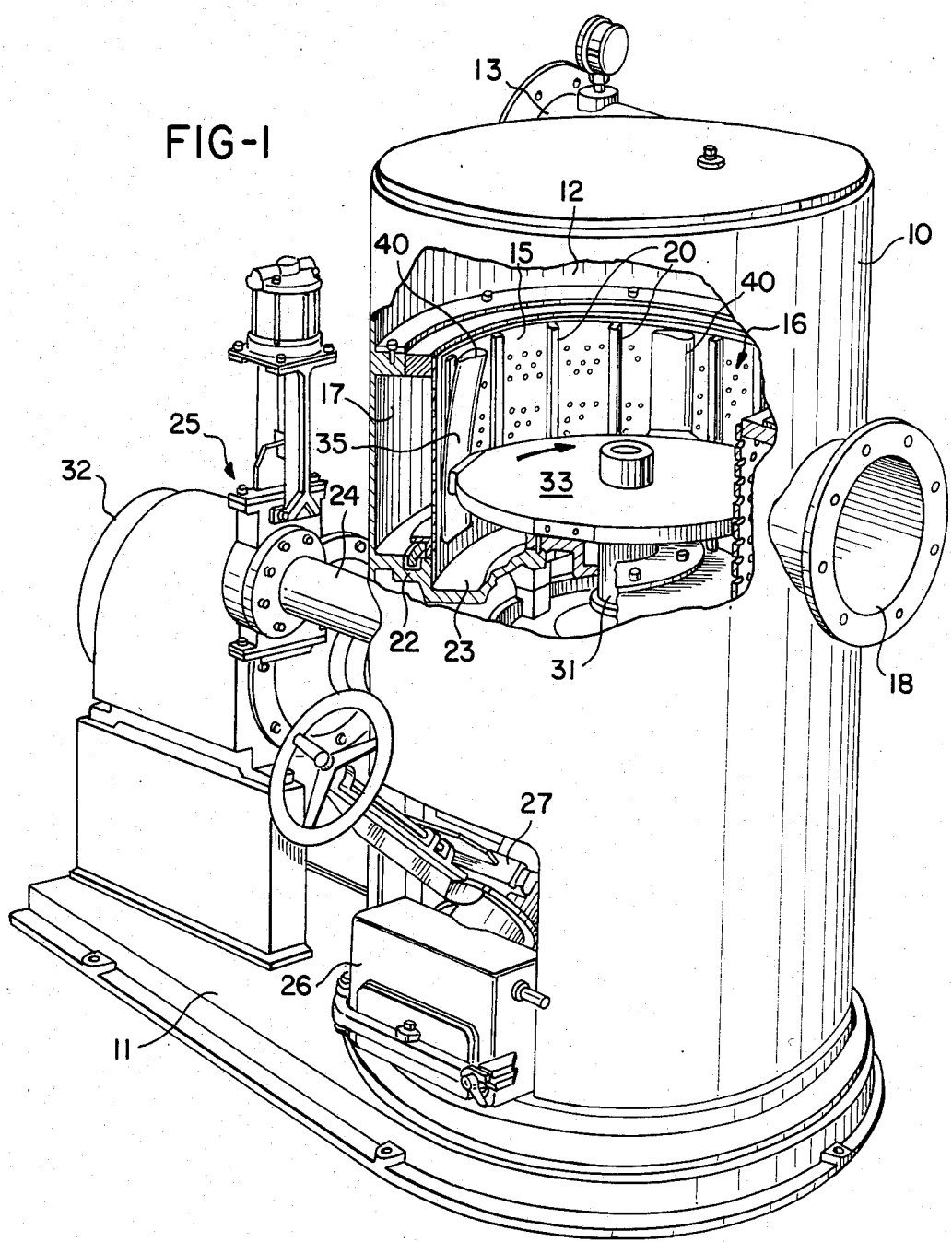
FIG. 1 is a perspective view, partly broken away, of a pressure screen incorporating the rotor of the invention.

The screening apparatus shown in FIG. 1 is constructed generally in accordance with Seifert '543 with certain exceptions in accordance with the invention. It comprises a main housing 10 on a base 11, and in the upper end of the housing is an inlet chamber 12 having a tangential inlet port 13 to which the feed stock is fed under pressure as is customary with such screening apparatus.

A cylindrical screening member 15 provided with multiple substantially circular screening holes 16 divides the interior of the housing below chamber 12 into a central supply chamber and an accepts chamber 17 having an outlet port 18. The screening cylinder 15 is provided along its inner (inlet) side with a plurality of bars 20, of essentially square section, which extend generally axially thereof in circumferentially spaced relation.

The bottom wall 22 of the supply chamber includes a trough 23 leading to a discharge port 24 provided with a control valve assembly 25 which can be preset to provide a desired continual bleed flow of reject-rich stocx. Heavy particles which settle into the trough 23 drop therefrom to the heavy trash collection box 26 by way of manually controlled valve 27 for intermittent removal.

The rotor indicated generally at 30 is supported on a drive shaft 31 in the center of the supply chamber, and is driven through suitable gearing or belts by a motor 32 also mounted on the base 11. The rotor 30 comprises a single flat imperforate and substantially circular disk or plate 33 provided with a centrally located hub by which it is mounted on the shaft 31.

The rotor 30 is shown as a four-vaned rotor, and it is accordingly provided at four equi-spaced positions around its periphery with flattened areas to which the respective vanes 40 are secured by means of bolts 41. A flat shim 42 of appropriate thickness may be inserted between each vane 40 and the disk 33 to establish a desired radial spacing between the outermost portion of each vane and the radially inner face of the bars 20, a spacing of 1/16 inch being usually found to be satisfactory.

It is desirable, but not essential, that the connection between the disk 33 and the vanes 40 be located generally at the mid point of the vanes. For example, in a screen wherein each vane is 14 inches long and the inner diameter of the screening cylinder 15 is approximately 24 inches, satisfactory results have been obtained with the disk 33 formed of steel plate 1.5 inches in thickness and approximately 21 inches in diameter, and with the upper surface of this plate aligned with the longitudinal centers of the vanes 40.

Figure 2:
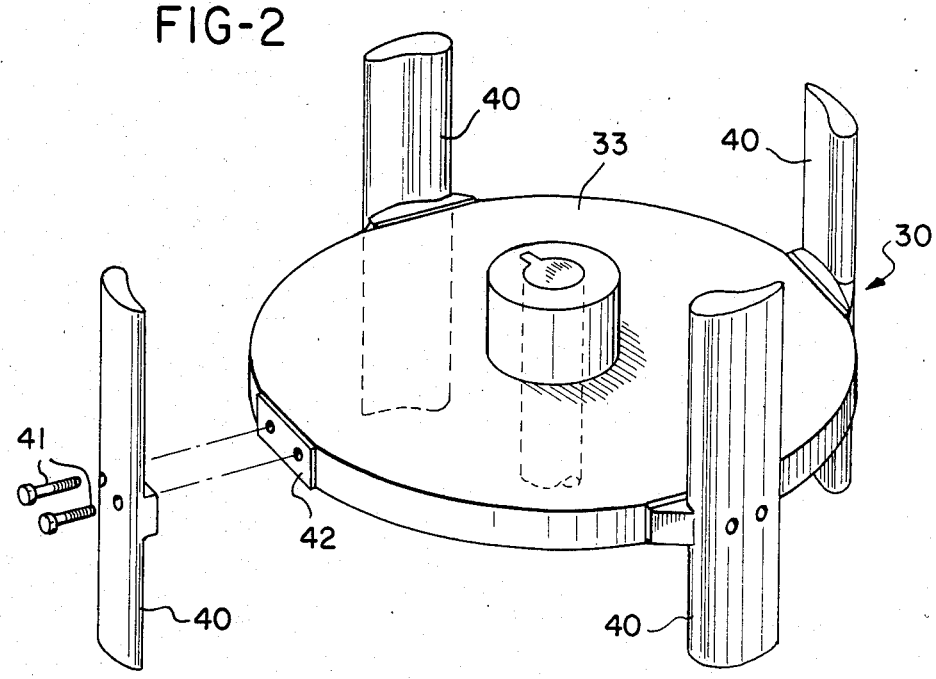
FIG. 2 is a perspective view, partially exploded, of the rotor in the screen of FIG. 1.

With the rotor constructed as described and shown in FIG. 2, there will oe an annular space 1.5 inches wide between the disk 33 and the screening cylinder 15 in which stock can recirculate from below the disk to the space above it, and with the disk 33 thus of a smooth surface and uniform dimensions, it will have minimum pumping effect on the stock and should thus require minimum power to drive it. If a greater amount of circulation is desired, the rotor may be modified as shown in FIGS. 3-5.

Figure 3:
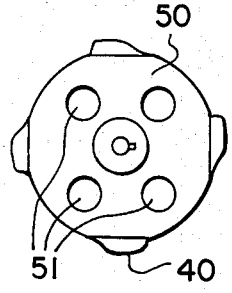
FIGS. 3-5 are axial views showing three modifications of the rotor shown in FIG. 2.
Figure 4:
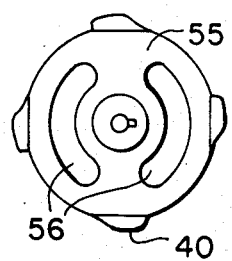

Thus in FIG. 3, the rotor differs from the rotor 30 only in that the disk 50 is provided with four round through holes 51 equally spaced therein, and in FIG. 4, the rotor disk 55 has a pair of elongated through holes 56. Each of these disks is therefore lighter than the disk 33, and the holes therethrough provide for increased circulation within the supply chamber, but the trailing edges of these holes will have some pumping effect which may impose a correspondingly increased power load on the drive motor.

Figure 5:
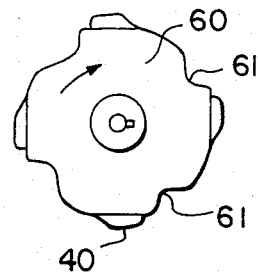

The rotor disk 60 in FIG. 5 has no through holes, but it is notched at 61 to provide a series of tear-drop peripheral portions which will both provide increased space for circulation of stock within the supply chamber, and also provide some centrifugal pumping effect which will further contribute to circulation but also increase the power load requirements. It is to be understood that any form of the rotor of the invention may be used with screen cylinders having perforations of a variety of sizes and shapes, including the axial slots of Seifert U.S. Pat. No. 3,849,302 and the circumferential slots of the Chupka-Seifert patents noted above.

It is also to be understood that the vanes 40 in the drawings typify any form of vane suitable for use in this class of screening apparatus. For example, the vanes may be of inclined straight air foil shape, as shown in the above Chupka-Seifert U.S. Pat. No. 3,970,548, or of the chevron shape shown in Chupka-Seifert U.S. Pat. No. 4,328,096.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. Pressurized screening apparatus for a liquid suspension of paper making stock including a substantially vertical housing, a perforate cylindrical screen member mounted within said housing with the central axis thereof substantially vertical and separating the interior of said housing into a supply chamber and an accepts chamber on the inside and outside respectively of said screen member, inlet means fo supplying the suspension only to one end of said supply chamber, and outlet port from said accepts chamber, reject oulet means located to receive reject material only from the opposite end of said supply chamber from said inlet means, means for feeding the stock under pressure to said one end of said supply chamber via said inlet means, a rotor mounted for rotation within said screen member on a shaft coaxial with said screen member, and drive means for said rotor, wherein said rotor comprises:
    (a) a substantially circular disk,
    (b) hub means at the center of said disk for mounting the same on said shaft,
    (c) said disk being imperforate and of a thickness constituting a very minor fraction of the axial length of said screen member,
    (d) said disk having an outer diameter relatively slightly less then the inner diameter of said screen member to provide a correspondingly narrow annular space therebetween,
    (e) the periphery of said disk being essentially smoothly convex to minimize the pumping effect thereof on the stock, and
    (f) vanes mounted on said disk in closely spaced relation from the inner surface of said screen member and extending lengthwise of said screen member for rotation with said disk in said annular space.

2. Screening apparatus as defined in claim 1 wherein said vanes are mounted on the outer periphery of said disk, and the outer diameter of said disk is less than the inner diameter of said screen member by a distance relatively slightly greater than the radial dimension of each of said vanes.

* * * * *